United States Patent [19]

McLean

[11] Patent Number: 4,798,444

[45] Date of Patent: Jan. 17, 1989

[54] SOLAR COLLECTION DEVICE

[76] Inventor: Bret L. McLean, 510 Bonnie Brae, Niles, Ohio 44446

[21] Appl. No.: 61,421

[22] Filed: Jun. 12, 1987

[51] Int. Cl.$^4$ .............................................. G02B 6/04
[52] U.S. Cl. ............................... 350/96.24; 350/96.1; 350/96.15; 350/96.18; 350/96.27
[58] Field of Search ............... 350/96.10, 96.15, 96.20, 350/96.24, 96.25, 96.26, 96.27, 96.18, 258, 259, 261, 262, 264, 265; 362/32

[56] References Cited

U.S. PATENT DOCUMENTS 4,272,156  6/1981  Ishibashi et al. ................. 350/96.26
4,500,167  2/1985  Mori .................................. 350/96.24

Primary Examiner—William L. Sikes
Assistant Examiner—Frank González
Attorney, Agent, or Firm—Harpman & Harpman

[57] ABSTRACT

A solar collection device used to maximize solar collection by a plurality of fixed collectors that concentrate all available sunlight on its surface into a single transfer conduit. The device uses fiber optics in pre-arranged and fixed arrays that will track the inclination of the suns rays without moving by using a single directional convergent lens.

4 Claims, 2 Drawing Sheets

SOLAR COLLECTION DEVICE

BACKGROUND OF THE INVENTION

1. Technical Field

This invention relates to solar light collection systems that use solar energy as a light source and transfer that light via fiber optic cables.

2. Description of Prior Art

Prior Art devices of this type have relied on a variety of different collection configurations with primary emphasis on concentrating and directing the solar light. Sun tracking devices have been developed to adjust the collectors to the varying angular inclination of the suns track during the day which varies due to the earths rotation and the seasonal variations, see for example U.S. Pat. No. 4,297,000, U.S. Pat. No. 4,511,755, U.S. Pat. No. 4,152,752 and U.S. Pat. No. 3,511,559.

In U.S. Pat. No. 4,297,000 a solar lighting system is disclosed that uses a solar collector and a tracking mechanism. The collector is a parabolic mirror to concentrate the solar light on a fiber optic bundle that extends into the building. Various fiber bundles are then branched off to illuminate distant interior areas.

In U.S. Pat. No. 4,511,755 a solar collection apparatus is disclosed wherein a plurality of lenses are mounted in spaced parallel relation to their respective focal points which are pigtails to gather the concentrated solar light and direct same for use.

U.S. Pat. No. 4,152,752 discloses an illumination system having a central collector and a network of light pipes to direct light to outlet fixtures controlled by light switches and variable light transmission devices.

U.S. Pat. No. 3,511,559 has a light gathering globe with light transmission tube with internal reflectors. A light dispersion fixture is positioned inside the building and has a convex centrally located reflector to reflect and dissipate the light over a large area within the structure.

SUMMARY OF THE INVENTION

A solar collection device that gathers and concentrates solar light energy into a plurality of independently spaced fixed fiber optic bundles. The device is so aligned as to track the suns angle of deviation during the day enhancing its efficiency and usefulness.

DESCRIPTION OF THE PREFERRED EMBODIMENT

Figure 1:
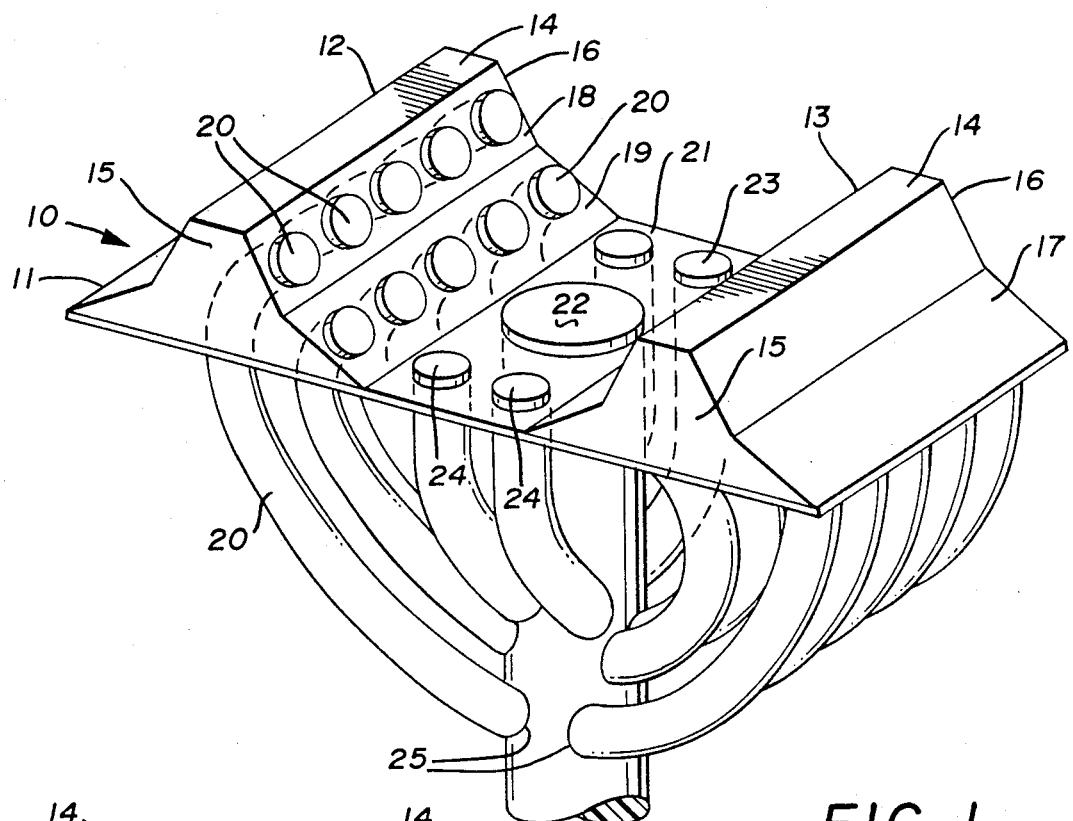
FIG. 1 is a perspective view of the solar collector.
Figure 2:
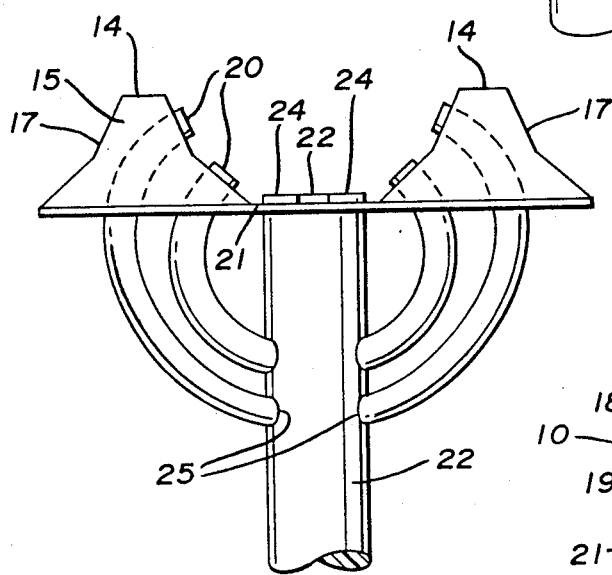
FIG. 2 is a side plan view of the solar collector.

A solar collector 10 can be seen in FIGS. 1 and 2 of the drawings having a main frame 11 comprising a generally rectangular structure with a pair of oppositely disposed upstanding portions 12 and 13. Each of the upstanding portions 12 and 13 have a elongated rectangular top 14, vertical end walls 15 and 16, a pair of outwardly facing side walls 17 and two inwardly facing angularly positioned panels 18 and 19 each having a different relative alignment.

A plurality of fiber optic bundles 20 are positioned in each of the panels 18 and 19 in spaced longitudinally aligned relation to one another and in oppositely disposed aligned relation between said panels.

Each of the upstanding portions 12 and 13 with its associated fiber optic bundles are spaced in relation to one another by a main support plate 21 having a centrally positioned large diameter fiber optic bundle 22.

Pairs of secondary fiber optic bundles 23 and 24 are positioned on either side of said central fiber optic bundle 22 all of which are aligned co-planar with the support plate 21.

The fiber optic bundles 20 and secondary fiber optic bundles 23 and 24 extend away and downwardly from their respective sun engagement ends and intersect with the larger diameter fiber optic bundle 22 annularly on the outer surface of same at 25.

Figure 4:
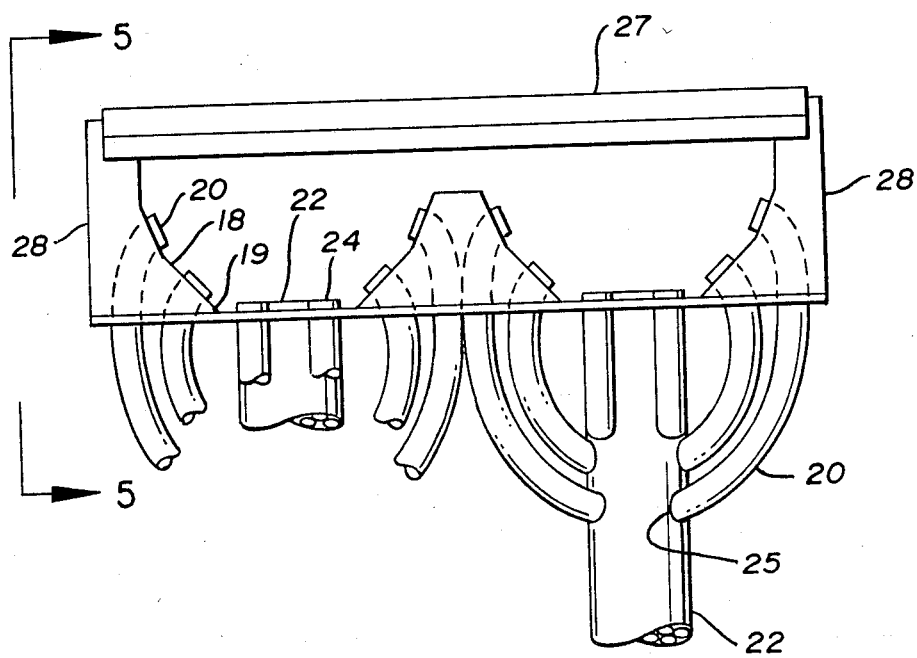
FIG. 4 is a side plan view of an array of solar collectors.
Figure 5:
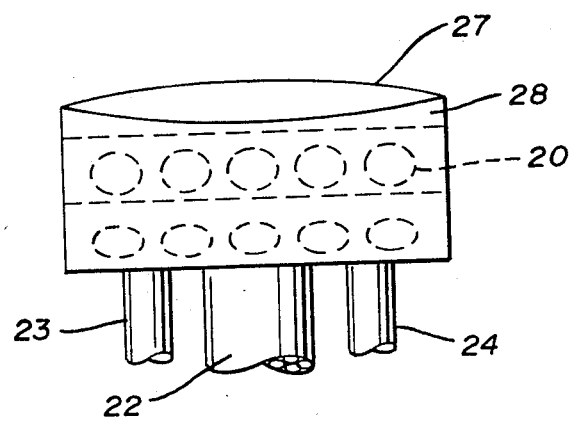
FIG. 5 is an end view on lines 5—5 of FIG. 4.

Referring to FIGS. 4 and 5 of the drawings a typical multiple array 26 of the solar collectors 10 is disclosed wherein two of the collectors are mounted together with extended vertical side wall portions 28. A continuous and contoured lip 29 is formed on the respective side wall portions 28 to hold and support a convergent single directional lens 27 therebetween extending over two of the solar collectors 10.

Figure 6:
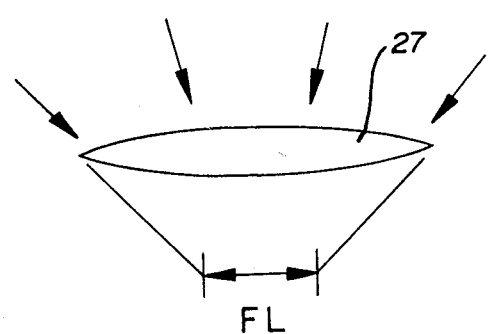
FIG. 6 is a graphic representation of sun angle inclination on a convergent lens.

Referring to FIG. 6 of the drawings, the convergent lens 27 is illustrated in graphic form with the angle of sun inclination illustrated and corresponding area of multiple focal points FL during the daylight hours as the relative angle of the sun on the collectors changes.

The use of convergent lens 27 effectively tracks the sun by maintaining the focal point of the light engagement on the collector within a given path. It is the combination of the positioning of the fiber optic bundles on the solar collector and the convergent lens 27 that makes this solar collector system highly efficient without the cost of a mechanical moving tracking device.

Figure 3:
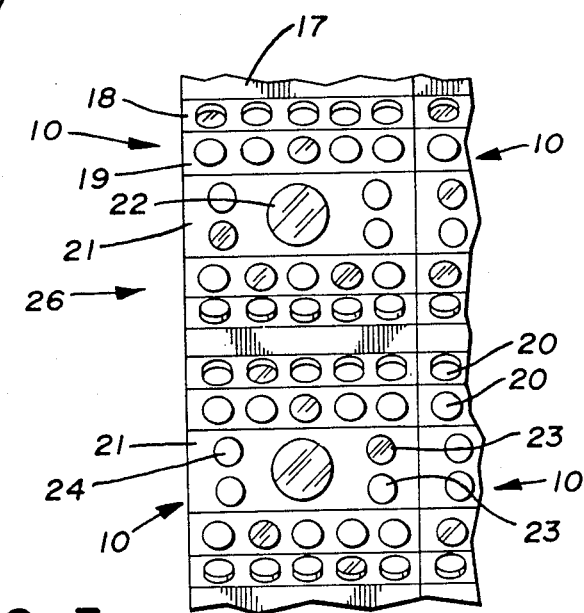
FIG. 3 is a top plan view of a portion of an array of the solar collectors as would be present in use.

Referring now to FIG. 3 of the drawings, the multiple array 26 of the solar collectors 10 can be seen (with the convergent lens 27 removed for clarity) as would be used in a typical application or a plurality of solar collectors are aligned in end to end relation and side by side alignment for use on a structure. Thus aligned, the solar collectors 10 will maximize the time and relative angle of sun impingement on the fiber optic bundles. Since the suns angle north and south varies from winter to summer the relative positioning of the solar collectors 10 in an array 26 is critical to maximize sun time on the fiber optic bundles. By aligning the panels 18 and 19 at divergent angles of less than 90° of the vertical and facing towards one another in spaced relation the fiber optic bundles 20 achieve maximum sun penetration even though the fiber optics in general are not efficient in transferring light directed towards them at an angle greater than 30° of their longitudinal axis.

By utilizing the plurality of fiber optic bundles 20 in respective panels 18 and 19 the solar sunlight can be transferred into the main fiber optic bundle 22 at 25 below the solar collectors 10 surface as here and before described.

It should be noted that the angle of inclination of the fiber option bundles 20, 23, 24 into the main fiber optic bundle 22 is no greater that 30° of its longitudinal axis for maximum light transfer.

Thus, it will be seen that a new and novel solar collector has been illustrated and described using fiber optics in a fixed ray to maximize the inherent variations of the suns inclination as it travels the sky and that various changes and modifications may be made therein without departing from the spirit of the invention, therefore I claim:

1. A solar collection device comprising a plurality of fiber optic bundles of a pre-determined size, a main support frame having oppositely disposed angularly aligned upstanding portions in spaced relative relation to one another, pairs of angularly arranged panels are positioned on each of said upstanding portions of said main support frame, a main fiber optic bundle and secondary fiber optic bundles are positioned between said upstanding portions on said main support frame on the same horizontal plane, some of said fiber optic bundles are arranged in aligned spaced relation in said angularly arranged panels on said upstanding portions, a convergent lens in spaced relation to said plurality of fiber optic bundles, means for interconnecting said plurality of fiber optic bundles with said main fiber optic bundle.

2. The solar collection device of claim 1 wherein said means for interconnecting said plurality of fiber optic bundles with said main fiber optic bundle comprises interconnecting said fiber optic bundles annularly below the horizontal plane of said support frame.

3. The solar collector of claim 1 wherein said each of said upstanding portions are identical and are interconnected by a flat planar portion of said main frame support frame having said main fiber optic bundle and secondary fiber optic bundles positioned therein.

4. A solar collector device comprising in combination a plurality of fiber optic bundles spaced within a main support frame having oppositely disposed angularly aligned upstanding portions in spaced relative relation to one another, a main fiber optic bundle and secondary fiber optic bundles are positioned between said upstanding portions on said main support frame, some of said fiber optic bundles are arranged in aligned spaced relation in angularly arranged panels on said upstanding portions of said main support frame, a convergent less positioned in spaced relation to all of said plurality of fiber optic bundles on said support frame, said upstanding portions of said main support frame are angularly arranged in oppositely disposed relation to one another.

* * * * *